US012320631B2

(12) United States Patent
Takagi

(10) Patent No.: US 12,320,631 B2
(45) Date of Patent: Jun. 3, 2025

(54) MEASUREMENT APPARATUS, IMAGE CAPTURING APPARATUS, MEASUREMENT SYSTEM, CONTROL METHOD, AND STORAGE MEDIUM

(71) Applicant: CANON KABUSHIKI KAISHA, Tokyo (JP)

(72) Inventor: Akinari Takagi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 423 days.

(21) Appl. No.: 17/560,523

(22) Filed: Dec. 23, 2021

(65) Prior Publication Data
US 2022/0113131 A1  Apr. 14, 2022

Related U.S. Application Data

(63) Continuation of application No. PCT/JP2020/024635, filed on Jun. 23, 2020.

(30) Foreign Application Priority Data

Jun. 28, 2019 (JP) ................................ 2019-122099
Jun. 19, 2020 (JP) ................................ 2020-106407

(51) Int. Cl.
*G06K 9/00* (2022.01)
*G01B 11/25* (2006.01)
(Continued)

(52) U.S. Cl.
CPC .......... *G01B 11/2545* (2013.01); *G06T 7/521* (2017.01); *G06T 7/593* (2017.01); *G06T 7/70* (2017.01); *G06T 2207/10012* (2013.01)

(58) Field of Classification Search
CPC ..... G01B 11/2545; G06T 7/521; G06T 7/593; G06T 7/70; G06T 2207/10012
See application file for complete search history.

(56) References Cited

U.S. PATENT DOCUMENTS 6,750,873 B1 *  6/2004 Bernardini ................ G06T 7/55
                                                        345/581
11,099,008 B2 *  8/2021 Hamaguchi ............ G01B 11/25
(Continued)

FOREIGN PATENT DOCUMENTS

CN    102472613 A     5/2012
CN    103069250 A *   4/2013 ............. G01B 11/25
(Continued)

OTHER PUBLICATIONS

Computer Vision Three-Dimensional Data from Images, Reinhard Klette at al., Springer, 1998, pp. 347-375 (Year: 1998).*
(Continued)

*Primary Examiner* — Jayesh A Patel
(74) *Attorney, Agent, or Firm* — Cowan, Liebowitz & Latman, P.C.

(57) ABSTRACT

A measurement apparatus, comprising: a projection apparatus configured to project a predetermined pattern on a subject; and an image capturing system configured to capture a group of images from at least two different viewpoints, wherein the distance between the viewpoints is shorter than the distances between the projection apparatus and the viewpoints, the measurement apparatus further comprising: relative position calculation means for obtaining a relative position of the projection apparatus relative to at least one of the viewpoints from pattern image positions on the group of images and a positional relationship between the viewpoints, wherein distance information regarding the subject is acquired from the relative position and a pattern image position on an image at the viewpoint.

20 Claims, 11 Drawing Sheets

(51) Int. Cl.
  *G06T 7/521* (2017.01)
  *G06T 7/593* (2017.01)
  *G06T 7/70* (2017.01)

(56) References Cited

U.S. PATENT DOCUMENTS

| | | | |
|---|---|---|---|
| 2002/0196415 A1 | 12/2002 | Shiratani | |
| 2010/0091301 A1* | 4/2010 | Masuda | G01B 11/2545 356/601 |
| 2012/0127290 A1* | 5/2012 | Tojo | G01N 21/41 348/61 |
| 2013/0229666 A1* | 9/2013 | Suzuki | G01B 11/25 356/610 |
| 2014/0022246 A1* | 1/2014 | Ono | H04N 13/296 345/419 |
| 2016/0102972 A1* | 4/2016 | Kobayashi | G01B 11/002 356/612 |
| 2016/0300356 A1* | 10/2016 | Kitamura | G06T 7/521 |
| 2018/0152662 A1* | 5/2018 | Takahashi | H04N 23/672 |
| 2018/0315205 A1* | 11/2018 | Moribe | G06T 5/50 |
| 2019/0236798 A1* | 8/2019 | Rochette | H04N 13/239 |
| 2021/0110574 A1* | 4/2021 | Kaino | G06T 7/521 |
| 2021/0156677 A1* | 5/2021 | Fu | G06T 7/521 |

FOREIGN PATENT DOCUMENTS

| | | | | |
|---|---|---|---|---|
| CN | 103261836 A | | 8/2013 | |
| CN | 103366360 A | | 10/2013 | |
| CN | 104792277 A | | 7/2015 | |
| CN | 104903680 A | * | 9/2015 | G01B 11/002 |
| CN | 105190232 A | | 12/2015 | |
| CN | 105547190 A | | 5/2016 | |
| CN | 106969704 A | | 7/2017 | |
| JP | 09-42940 A | | 2/1997 | |
| JP | H0942940 A | * | 2/1997 | |
| JP | 2002286415 A | * | 10/2002 | G01B 11/2509 |
| JP | 2003329418 A | * | 11/2003 | |
| JP | 2004110804 A | * | 4/2004 | G01C 11/06 |
| JP | 2006058215 A | | 3/2006 | |
| JP | 2008241643 A | * | 10/2008 | |
| JP | 2009264862 A | | 11/2009 | |
| JP | 2012058076 A | * | 3/2012 | |
| JP | 2015135294 A | * | 7/2015 | G01B 11/25 |
| JP | 2017020971 A | * | 1/2017 | |
| JP | 6450982 B2 | | 1/2019 | |
| WO | WO-2005010825 A2 | * | 2/2005 | G01B 11/2513 |

OTHER PUBLICATIONS 3D shape measurement based on projection of triangular patterns of two selected frequencies, Pu Cao et al., 2014, pp. 1-15 ( Year: 2014).*
Combining Multiple Depth Cameras and Projectors for Interactions On, Above, and Between Surfaces, Andrew D. Wilson et al., ACM, 2010, pp. 273-282 (Year: 2010).*
Distance Measurement Using Single Non-metric CCD Camera, Ti-Ho Wang et al., 20017, pp. 1-6 (Year: 2017).*
Shape From Projecting a Stripe Pattern, Minoru Asada et al., IEEE, 1987, pp. 787-792 (Year: 1987).*
Determining Surface Orientation by Projecting a Stripe Pattern, Minoru Asada et al., IEEE, 1988, pp. 749-754 (Year: 1988).*
Real-time flatness inspection of rolled products based on optical laser triangulation and three-dimensional surface reconstruction, Julio Molled et al., 2010, pp. 031206-1-031206-14 (Year: 2010).*
The foreign references 1 and 3-5 were cited in the International Search Report dated Sep. 15, 2020 of the corresponding International Application PCT/JP2020/024635.
The Feb. 8, 2024 Chinese Office Action, which is enclosed with an English Translation, that issued in Chinese Patent Application No. 202080047551.7.
A Chinese Office Action that issued on Dec. 19, 2024, which is enclosed, with a translation, that issued in the corresponding Chinese Patent Application No. 202080047551.7.

* cited by examiner

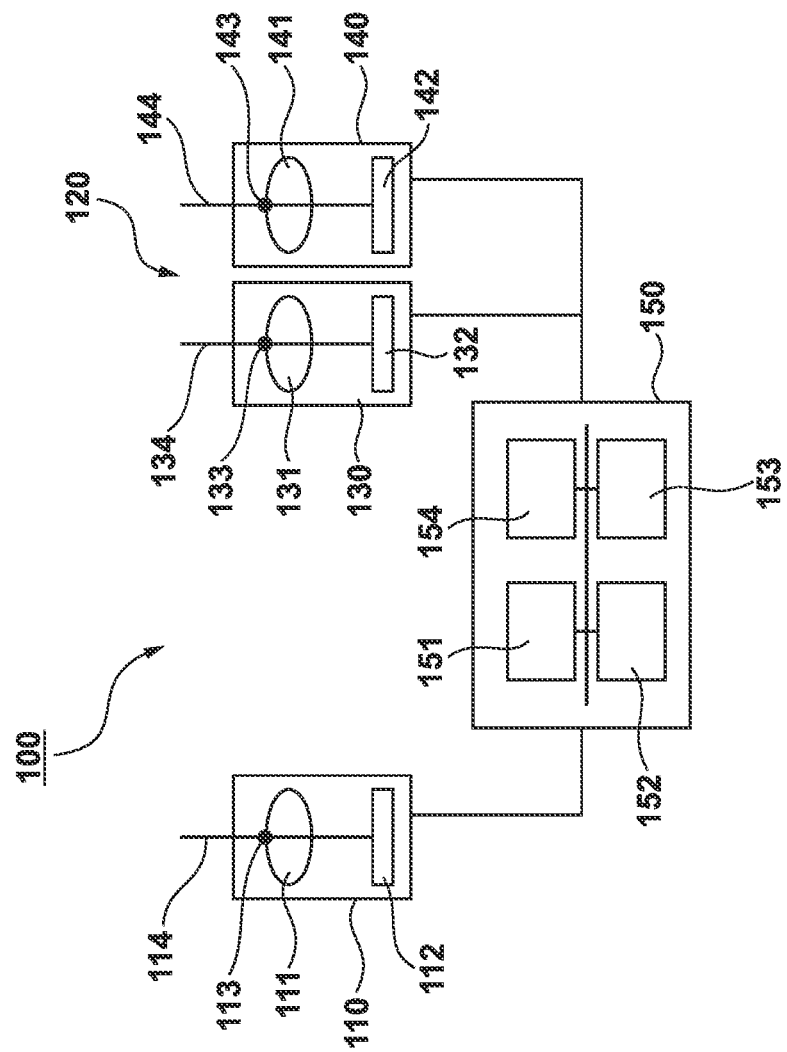

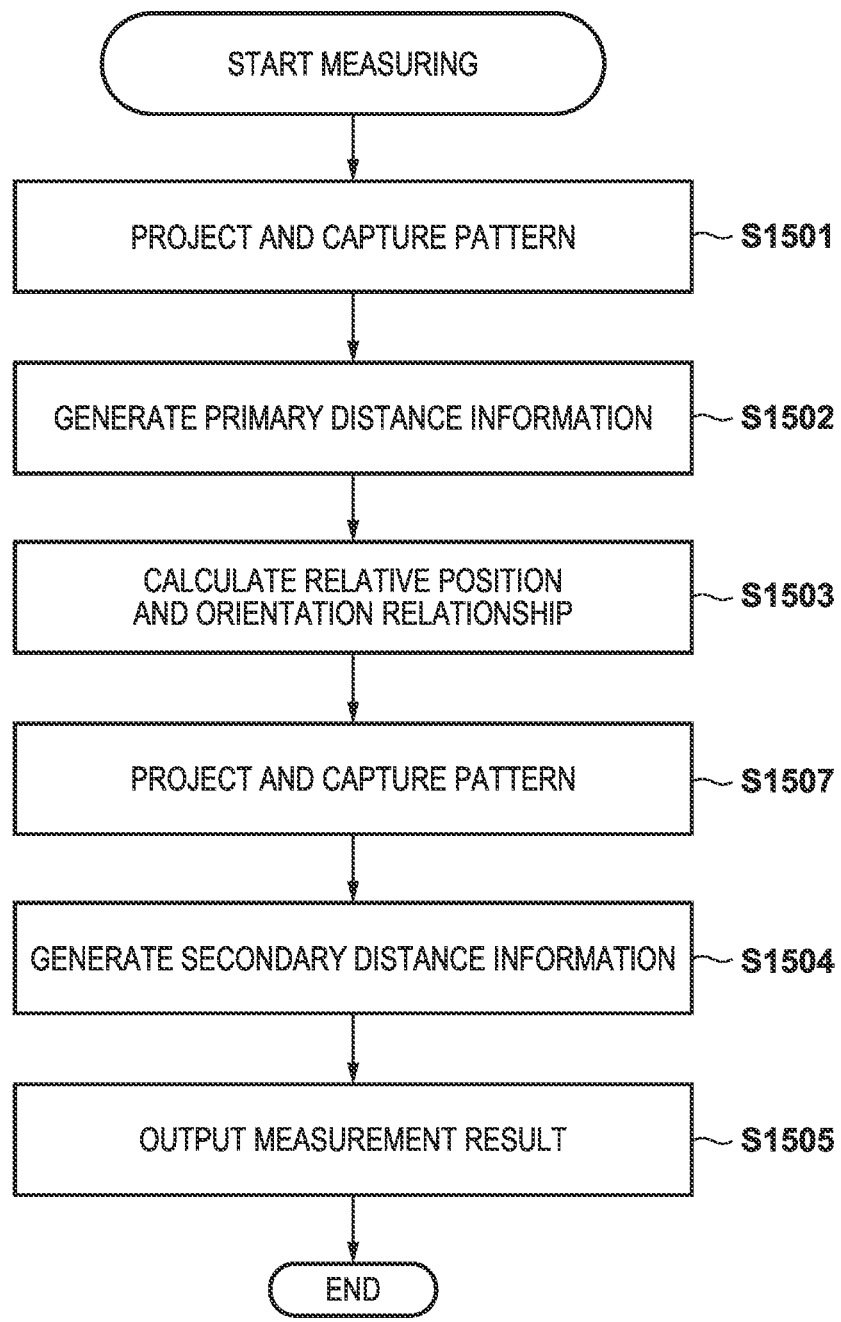

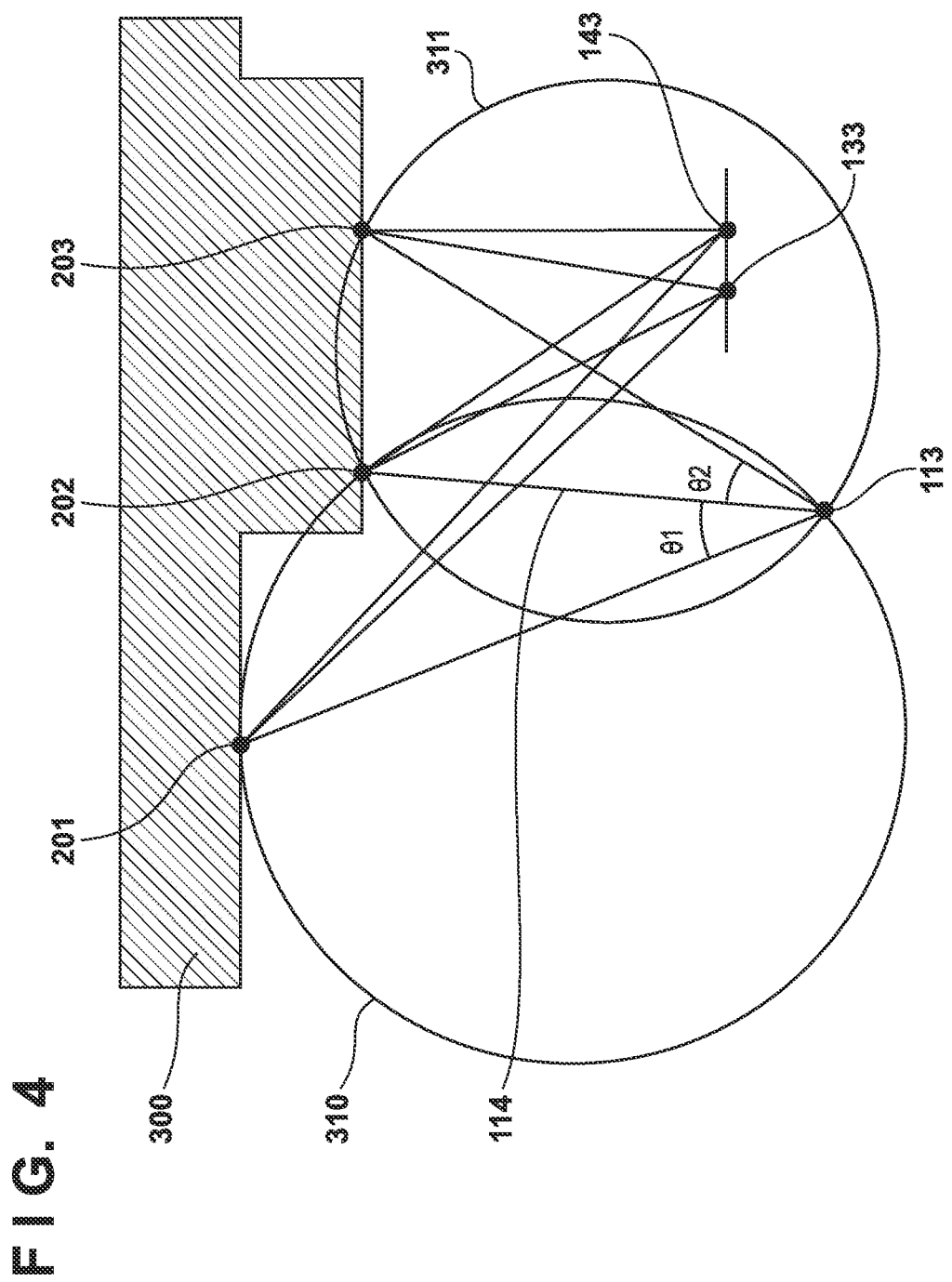

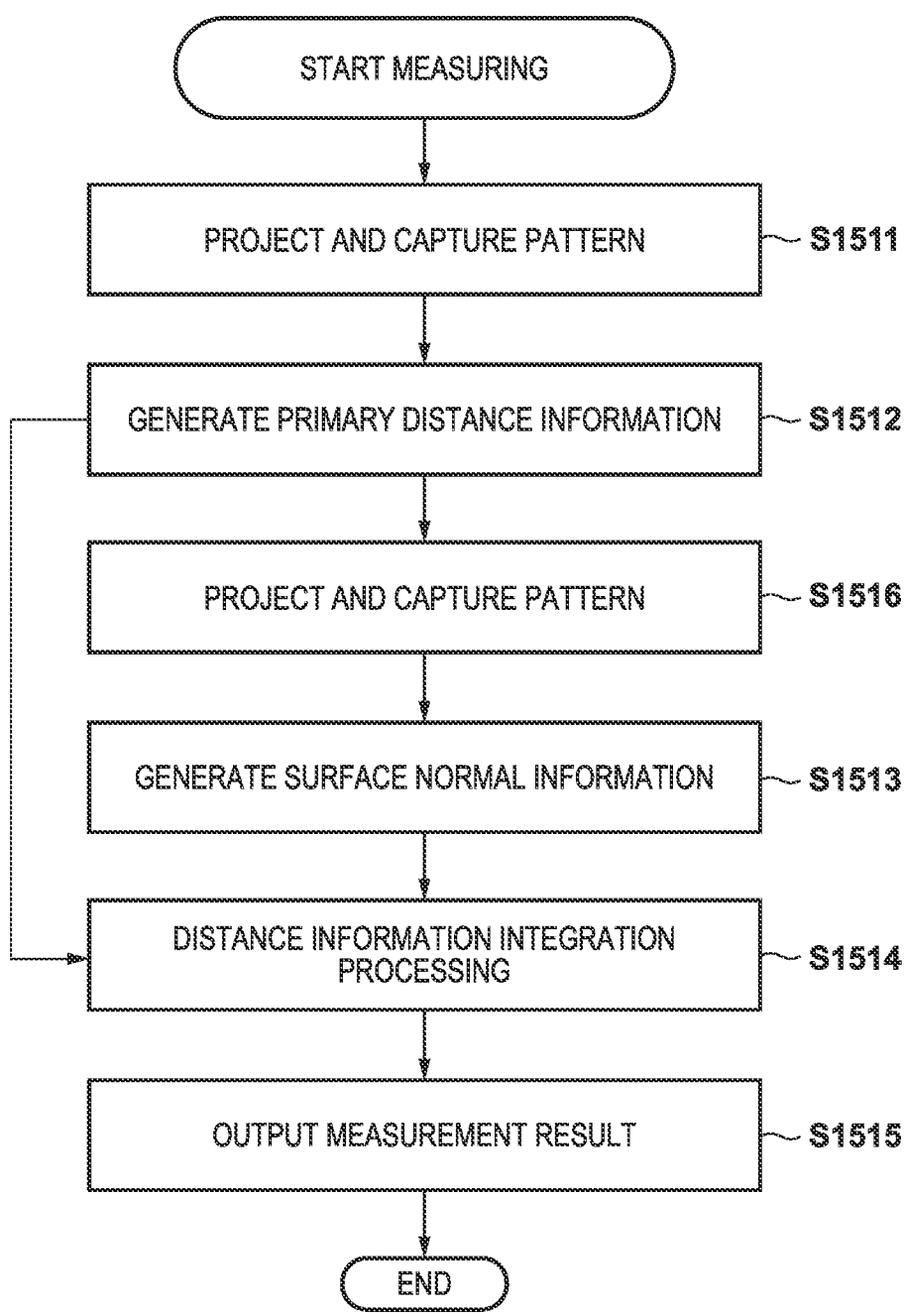

MEASUREMENT APPARATUS, IMAGE CAPTURING APPARATUS, MEASUREMENT SYSTEM, CONTROL METHOD, AND STORAGE MEDIUM

CROSS-REFERENCE TO RELATED APPLICATIONS

This application is a Continuation of International Patent Application No. PCT/JP2020/024635, filed Jun. 23, 2020, which claims the benefits of Japanese Patent Application No. 2019-122099, filed Jun. 28, 2019, and Japanese Patent Application No. 2020-106407, filed Jun. 19, 2020, both of which are hereby incorporated by reference herein in their entirety.

BACKGROUND OF THE INVENTION

Field of the Invention

The present invention relates to a measurement apparatus, an image capturing apparatus, a measurement system, a control method, and a storage medium, and in particular relates to a measurement technique in which a plurality of distance measurement methods including a stereo method are used in combination.

Background Art

Heretofore, a technique for acquiring distance information and shape information of a subject using the triangulation principle from an image obtained by capturing, that is, a so-called stereo method has been proposed. For example, a passive stereo method is known for measuring the shape of a subject using the triangulation principle using a pair of disparity images that is acquired by capturing the subject by two image capturing apparatuses that are placed at different positions. Also, a pattern projection stereo method is known for measuring the shape of an object with small amount of texture, or the shape of an object in a dark place. In the pattern projection stereo method, a predetermined pattern is projected on a subject by a projection apparatus, and an image is captured by an image capturing apparatus that is placed at a position different from that of the projection apparatus, and distance information and shape information regarding the subject is acquired using the triangulation principle from the positional relationship between the projection apparatus and the image capturing apparatus and the positional relationship of patterns on the images obtained by capturing. Furthermore, a hybrid method in which a pattern projection stereo method and a passive stereo method are used in combination is proposed aiming at improving the accuracy and the like (PTL 1).

CITATION LIST

Patent Literature

PTL 1: Japanese Patent Laid-Open No. 2002-286415

In PTL 1, a hybrid method in which a pattern projection stereo method and a passive stereo method are used in combination is proposed, but the specific configuration and method is not disclosed.

Because the stereo method uses the triangulation principle, it is important that the positional relationship between two elements that causes disparity is predetermined (known) and is stable, in order to obtain high measurement accuracy.

Here, the two elements are two image capturing apparatuses in the passive stereo method, and are a projection apparatus and an image capturing apparatus in the pattern projection stereo method. Therefore, when the passive stereo method and the pattern projection stereo method are used in combination, it is important that the positional relationship between the two image capturing apparatuses and the positional relationship between one image capturing apparatus and the projection apparatus are known and stable, in order to obtain high measurement accuracy.

Also, due to the triangulation principle, it is advantageous that the distance (baseline length) between two elements for causing a disparity is longer, in order to obtain high measurement accuracy.

However, in order to make the positional relationship between two elements be known and stable under a temperature environment and the presence of vibration or the like, the two elements need to be sturdily fixed, and there is a problem that the configuration of the measurement system becomes complex, and the size thereof increases. Furthermore, if the baseline length, which is the distance between two elements, is increased in order to perform highly accurate measurement, the mechanical stability decreases, and therefore there is a problem that the size of the mechanism for holding the two elements further increases.

On the other hand, if the positional relationship between a projection apparatus and an image capturing apparatus is fixed, the adjustable range of the projection position and direction is limited, because a pattern needs to be projected according to the shape of a subject such that a shadow will not occur, or the like, for example, and therefore there is a problem that the usability decreases.

Also, a texture can be formed on a subject by projecting a pattern using a projection apparatus, and therefore measurement of the shape of an object with small amount of texture, or the shape of an object in a dark place becomes possible with the passive stereo method. However, in this case, the pattern projection is only aimed at improving the passive stereo method, and this configuration differs from the configuration in which the pattern projection stereo method is used in combination. Therefore, there is a problem that the measurement stability and accuracy is low compared to the case of the hybrid type.

The present invention has been made in order to reduce at least one of the problems of known techniques, and is aimed at providing a measurement apparatus, an image capturing apparatus, a measurement system, a control method, and a program for realizing a favorable measurement accuracy while suppressing the increase in the apparatus scale and the reduction in usability.

SUMMARY OF THE INVENTION

The present invention in its first aspect provides a measurement apparatus comprising: a projection apparatus configured to project a predetermined pattern on a subject; and an image capturing system configured to capture a group of images from at least two different viewpoints, wherein the distance between the viewpoints is shorter than the distances between the projection apparatus and the viewpoints, the measurement apparatus further comprising: at least one processor; and a memory storing a program that, when executed by the at least one processor, causes the at least one processor to function as: a relative position calculation unit configured to obtain a relative position of the projection apparatus relative to at least one of the viewpoints from pattern image positions on the group of images and a positional relationship between the viewpoints, wherein distance information regarding the subject is acquired from the relative position and a pattern image position on an image at the viewpoint.

The present invention in its second aspect provides a measurement apparatus, comprising: a projection apparatus configured to project a predetermined pattern on a subject; and an image capturing system configured to capture a group of images from at least two different viewpoints, wherein the pattern includes a stripe pattern in which line segments that extend in a direction perpendicular to a straight line connecting the two viewpoints are substantially periodically arranged in the direction of the straight line, surface normal information at a local position of the subject is acquired using a stripe interval, at the local position, of a pattern image on the image of the stripe pattern at at least one viewpoint, and distance information of the subject is acquired from the surface normal information, the distance between the viewpoints, and the pattern image positions on images at the viewpoints.

The present invention in its third aspect provides a measurement apparatus, comprising: a projection apparatus configured to project a predetermined pattern on a subject; and an image capturing system configured to capture a group of images from at least two different viewpoints, wherein the pattern is a pattern including a line segment, and distance information of a subject is acquired by extracting a boundary region of the subject based on the shape of a pattern image of the line segment on the images, and using information regarding the boundary region.

The present invention in its fourth aspect provides an image capturing apparatus, comprising: the measurement apparatus according to the first aspect, wherein the image capturing system also acquires an image that is captured without projecting the pattern.

The present invention in its fifth aspect provides a measurement system, comprising: a projection apparatus configured to project a predetermined pattern on a subject; an image capturing system configured to capture a group of images from at least two different viewpoints; and a measurement apparatus that is connected to the projection apparatus and the image capturing system, wherein the distance between the viewpoints is shorter than the distances between the projection apparatus and the viewpoints, the measurement apparatus further comprising: at least one processor; and a memory storing a program that, when executed by the at least one processor, causes the at least one processor to function as: a relative position calculation unit configured to obtain a relative position of the projection apparatus relative to at least one of the viewpoints from pattern image positions on the group of images and a positional relationship between the viewpoints, wherein distance information regarding the subject is acquired from the relative position and a pattern image position on an image at the viewpoint.

The present invention in its sixth aspect provides a measurement system, comprising: a projection apparatus configured to project a predetermined pattern on a subject; an image capturing system configured to capture a group of images from at least two different viewpoints; and a measurement apparatus that is connected to the projection apparatus and the image capturing system, wherein the pattern includes a stripe pattern in which line segments that extend in a direction perpendicular to a straight line connecting the two viewpoints are substantially periodically arranged in the direction of the straight line, and the measurement apparatus acquires surface normal information at a local position of the subject using a stripe interval, at the local position, of a pattern image on the image of the stripe pattern at at least one viewpoint, and acquires distance information of the subject from the surface normal information, the distance between the viewpoints, and the pattern image positions on images at the viewpoints.

The present invention in its seventh aspect provides a measurement system, comprising: a projection apparatus configured to project a predetermined pattern on a subject; an image capturing system configured to capture a group of images from at least two different viewpoints; and a measurement apparatus that is connected to the projection apparatus and the image capturing system, wherein the pattern is a pattern including a line segment, and the measurement apparatus acquires the distance information of a subject by extracting a boundary region of the subject based on the shape of a pattern image of the line segment on the images, and using information regarding the boundary region.

The present invention in its eighth aspect provides a control method of a measurement apparatus including a projection apparatus configured to project a predetermined pattern on a subject; and an image capturing system configured to capture a group of images from at least two different viewpoints, the distance between the viewpoints being shorter than the distances between the projection apparatus and the viewpoints, the control method comprises: obtaining a relative position of the projection apparatus relative to at least one of the viewpoints from pattern image positions on the group of images and a positional relationship between the viewpoints, wherein distance information regarding the subject is acquired from the relative position and a pattern image position on an image at the viewpoint.

The present invention in its ninth aspect provides a control method of a measurement apparatus including a projection apparatus configured to project a predetermined pattern on a subject; and an image capturing system configured to capture a group of images from at least two different viewpoints, wherein the pattern includes a stripe pattern in which line segments that extend in a direction perpendicular to a straight line connecting the two viewpoints are substantially periodically arranged in the direction of the straight line, and the control method comprises: acquiring surface normal information at a local position of the subject using a stripe interval, at the local position, of a pattern image on the image of the stripe pattern at at least one viewpoint, and acquiring distance information of the subject from the surface normal information, the distance between the viewpoints, and the pattern image positions on images at the viewpoints.

The present invention in its tenth aspect provides a control method of a measurement apparatus including a projection apparatus configured to project a predetermined pattern on a subject; and an image capturing system configured to capture a group of images from at least two different viewpoints, wherein the pattern is a pattern including a line segment, and the control method comprises: extracting a boundary region of a subject based on the shape of a pattern image of the line segment on the images, and acquiring distance information of the subject using information regarding the boundary region.

The present invention in its eleventh aspect provides a non-transitory computer-readable storage medium storing a program for causing a computer to function as the measurement apparatus according to the first aspect.

Further features of the present invention will become apparent from the following description of exemplary embodiments (with reference to the attached drawings).

The accompanying drawings, which are incorporated in and constitute a part of the specification, illustrate embodiments of the invention and, together with the description, serve to explain principles of the invention.

BRIEF DESCRIPTION OF THE DRAWINGS

FIG. 1 is a block diagram illustrating a functional configuration of a measurement system according to embodiments of the present invention.

FIG. 3B is a flowchart illustrating another modification of the distance measurement processing to be executed by the measurement apparatus 150 according to the first embodiment.

FIG. 4 is a diagram illustrating a method of calculating the position and posture of a projection apparatus 110 according to the first embodiment.

FIG. 7A is a flowchart illustrating a modification of the distance measurement processing to be executed by the measurement apparatus 150 according to the third embodiment.

DESCRIPTION OF THE EMBODIMENTS

Figure 2A:
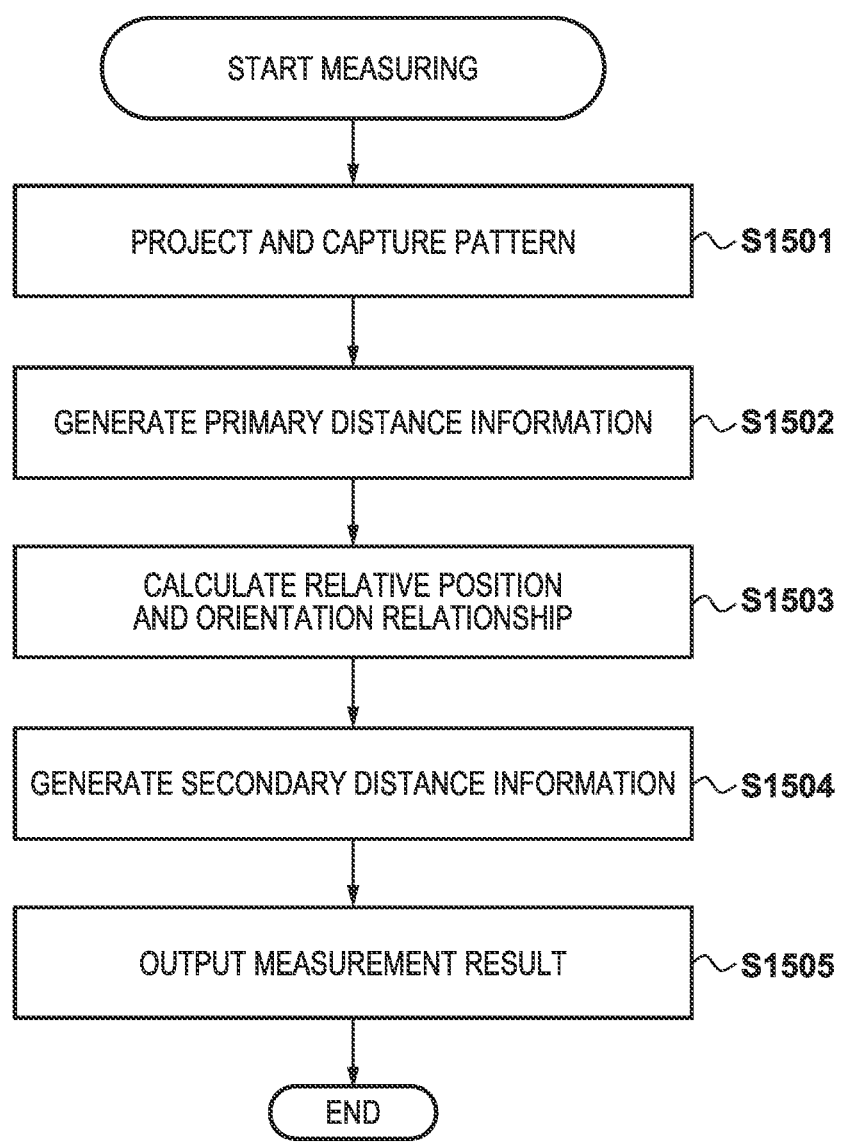
FIG. 2A is a flowchart illustrating distance measurement processing to be executed by a measurement apparatus 150 according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

One embodiment to be described below describes an example in which the present invention is applied to a measurement system that includes two image capturing apparatuses (cameras) and one projection apparatus, and a measurement apparatus to which these apparatuses are connected, and can measured the distance from the image capturing apparatus to a subject, as an example of a measurement system. However, the present invention can be applied to any device that can perform distance measurement in the depth direction using a passive stereo method in a state of performing pattern projection.

First Embodiment

An exemplary configuration of a measurement system 100 in the present invention is shown in FIG. 1.

In FIG. 1, the measurement system 100 is constituted by a projection apparatus 110 that projects a pattern on a subject, an image capturing system 120 that acquires disparity images based on a light flux from the subject, and a measurement apparatus 150.

The projection apparatus 110 is constituted by a projection optical system 111 and a patterning unit 112 that includes a spatial modulator or a reticle and an illumination unit such as an LED. The reference numeral 113 indicates an exit pupil of the projection optical system 111, and the reference numeral 114 indicates a projection axis representing a projection direction of the projection apparatus 110. The projection apparatus 110 includes a control unit (not shown) that includes a ROM in which a control program of the blocks of the projection apparatus 110 is recorded and a RAM that is used as a deploying region of the control program, and projects a pattern (light) on a subject by controlling the patterning unit 112.

The image capturing system 120 is constituted by a first camera 130 and a second camera 140, and captures a group of images from two different viewpoints. The first camera 130 includes a first image capturing optical system 131 and a first image sensor 132 such as a CCD or CMOS sensor, and captures an image with a first incident pupil 133 of the first image capturing optical system 131 being the viewpoint and a first image capturing axis 134 being the image capturing direction. The second camera 140 includes a second image capturing optical system 141 and a second image sensor 142 such as a CCD or CMOS sensor, and captures an image with a second incident pupil 143 of the second image capturing optical system 141 being the viewpoint and a second image capturing axis 144 being the image capturing direction. Note that the configuration is such that the distance between the first incident pupil 133 and the second incident pupil 143 is shorter than the distance between the exit pupil 113 of the projection apparatus and the first incident pupil 133 of the image capturing system 120. Also, the first camera 130 and the second camera 140 each include constituent elements that are included in a digital camera in common, such as a control unit constituted by a CPU, a ROM, and a RAM and an image processing unit that performs image processing such as development and correction on an image signal output from an image sensor, and generates a captured image of digital data.

The measurement apparatus 150 includes a control unit 151 constituted by a CPU, a memory 152, a relative position calculation unit 154, and a distance/shape calculation unit 153. The control unit 151 controls the operations of the blocks by reading out an operation program of the blocks that is stored in a nonvolatile portion (hereinafter, referred as a ROM, for convenience' sake) of the memory 152, deploying the operation program in another area of the memory 152, and executing the program. Also, the measurement apparatus 150 is connected to the image capturing system 120 and the projection apparatus 110, which are external apparatuses, and enables transmission and reception of data between the apparatuses.

Next, the flow of calculating the distance and shape performed by the measurement system 100 will be described using FIG. 2A. Each process step of this flow is executed by, as a result of the control unit 151 of the measurement apparatus 150 executing a corresponding control program, the control unit 151 or the blocks operating in accordance with the control of the control unit 151.

In step S1501, the control unit 151 instructs the projection apparatus 110 to project a pattern via a communication unit, and instructs the image capturing system 120 to capture an image in a state in which the pattern is projected via the communication unit, and acquires a pair of disparity images obtained by capturing from the image capturing system 120. As shown in FIG. 2B, the projection apparatus 110, upon receiving the instruction from the measurement apparatus 150, projects a pattern 200 on a subject by the patterning unit 112 and the projection optical system 111 in the direction of the projection axis 114. The image capturing system 120, upon receiving the instruction from the measurement apparatus 150, captures disparity images of the subject and the pattern 200 using the first camera 130 and the second camera 140.

In step S1502, the distance/shape calculation unit 153 calculates primary distance information regarding the subject using a known method of the passive stereo method from the positions of the subject and the pattern images on the captured disparity images, and the positional relationship between the viewpoints.

Next, in step S1503, the relative position calculation unit 154 calculates the position of the exit pupil 113 and the projection axis 114, which are the position and the posture of the projection apparatus 110 relative to the first incident pupil 133 of the image capturing system 120, from the primary distance information of the subject and the position of the pattern image on the disparity image. Note that, in the present embodiment, description will be given in which the relative position and posture with the position and posture of the first camera 130 being the reference are adopted as the position and posture of the projection apparatus 110. However, the relative position and posture with the position and posture of the second camera 140 being the reference may also be adopted.

Next, in step S1504, the distance/shape calculation unit 153 calculates secondary distance information of the subject using a known method of the pattern projection stereo method from the calculated position and posture of the projection apparatus 110, the position and posture of the image capturing system 120, and the positions of the pattern image on the disparity images.

Then, in step S1505, the control unit 151 stores the calculated secondary distance information in a storage unit, which is not shown, or outputs it to an external apparatus via a recording unit, a communication unit, or the like. Here, the distance (baseline length) between the exit pupil 113 of the projection apparatus 110 and the first incident pupil 133 of the image capturing system 120 is longer than the distance (baseline length) between the first incident pupil 133 and the second incident pupil 143 of the image capturing system 120. Therefore, the distance accuracy is higher in the secondary distance information obtained by the pattern projection stereo method executed by the projection apparatus 110 and the image capturing system 120 than in the primary distance information obtained by the passive stereo method executed by the image capturing system 120. Therefore, the first camera 130 and the second camera 140 of the image capturing system 120 need only keep the positional relationship with a baseline length shorter than the baseline length needed for obtaining a desired measurement accuracy, and therefore a higher distance measurement accuracy can be obtained with a simpler configuration.

Figure 2B:
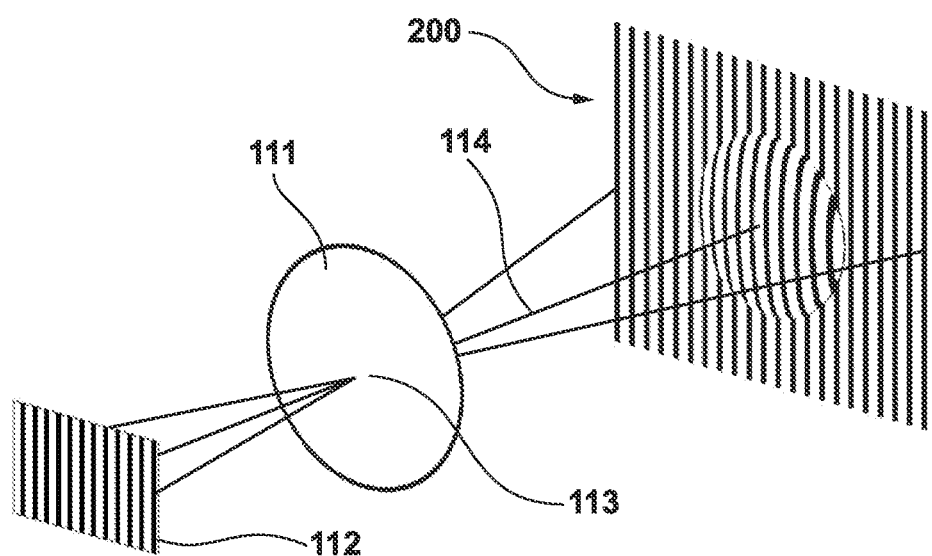
FIG. 2B is a diagram for describing a pattern projection mode in the first embodiment.
Figure 3A:
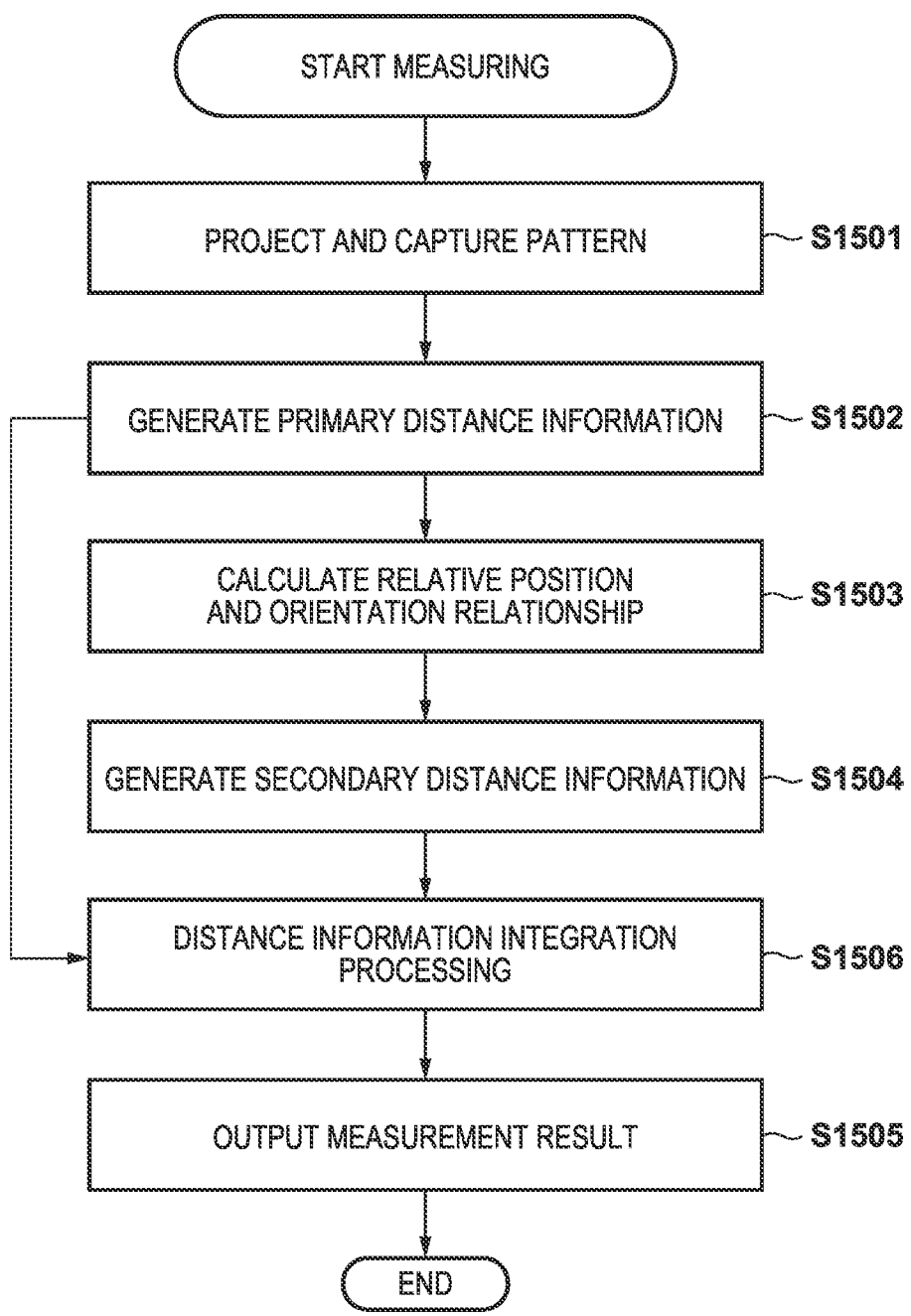
FIG. 3A is a flowchart illustrating a modification of the distance measurement processing to be executed by the measurement apparatus 150 according to the first embodiment.

Also, as shown in FIG. 3A, the control unit 151 may also perform processing in step S1506 in which the distance information of the subject is obtained by integrating the primary distance information obtained by the passive stereo method and the secondary distance information obtained by the pattern projection stereo method, in addition to the processing performed in FIG. 2A. Note that each process in the flow in FIG. 3A is also executed by the control unit 151 of the measurement apparatus 150 or by the blocks operating in accordance with the control of the control unit 151. There are cases where an area appears on which a pattern is not projected due to a shadow of a subject, depending on the relationship between the position of the projection apparatus 110 and the shape of the subject. In such a case, the primary distance information may be acquired with the passive stereo method using the pattern of the subject as a clue, and therefore, as a result of integrating the primary distance information with the secondary distance information, distance information with no loss can be obtained.

Next, the method of calculating the position of the exit pupil 113 and the projection axis 114, which represent the position and posture of the projection apparatus 110, from the primary distance information of a subject and the position of a pattern image on disparity images will be described using FIG. 4, the method being executed by the control unit 151 in step S1503. FIG. 4 shows a case where the distance is measured by projecting a pattern on a subject 300. The pattern is projected from the exit pupil 113 of the projection apparatus 110 in the direction of the projection axis 114, and disparity images are acquired regarding the first incident pupil 133 of the first camera 130 and the second incident pupil 143 of the second camera 140. First, the primary distance information is calculated with respect to any two points (pattern 201, pattern 202) on the pattern formed on the surface of the subject 300, and the relative position coordinates of the patterns relative to the position of the first incident pupil 133 of the first camera 130 is obtained. The relative position coordinate relative to the first incident pupil 133 is a position coordinate in an orthogonal coordinate system in which the first incident pupil 133 is the origin, a straight line connecting the first incident pupil 133 and the second incident pupil 143 is one axis, and another axis is set in a direction orthogonal thereto, for example. Next, when the projection angle between the pattern 201 and the pattern 202 is denoted as θ1, a circle 310 is obtained that passes two points of the pattern 201 and the pattern 202, and in which θ1 is a circumferential angle. Here, the exit pupil 113 of the projection apparatus is present at some position on the circumference of the circle 310. Note that the projection angle θ1 is known information regarding the projection apparatus 110, and is determined from a geometric relationship between the patterning unit 112 and the projection optical system 111, for example. Next, the primary distance information regarding another point (pattern 203) on the pattern formed on the surface of the subject 300 is calculated, and the relative position coordinate of the pattern relative to the position of the first incident pupil 133 of the first camera 130 is obtained. When the projection angle between the pattern 202 and the pattern 203 is denoted as θ2, a circle 311 is obtained that passes two points of the pattern 202 and the pattern 203, and in which θ2 is a circumferential angle. Here, the exit pupil 113 of the projection apparatus is present at some position on the circumference of the circle 311. That is, the intersection point, of the intersection points of the circle 310 and the circle 311, that is not the pattern 202 indicates the position of the exit pupil 113. In the present embodiment, a pattern on the projection axis is selected as the pattern 202. Here, a straight line including a line segment that connects the position of the exit pupil 113 and the position of the pattern 202 indicates the projection axis 114. As described above, the position of the exit pupil 113 and the projection axis 114, which represent the position and posture of the projection apparatus 110, can be calculated from the primary distance information of a subject and the position of a pattern image on disparity images.

Note that although, in the present embodiment, relative position information of three points on the subject surface is used, the position of the exit pupil 113 and the projection axis 114 may also be obtained with higher accuracy using averaging processing or the like using information regarding four points or more. Also, if prior information regarding the position coordinate of the exit pupil 113 and the direction of the projection axis 114 is present, the position of the exit pupil 113 and the projection axis 114 can be obtained with relative position information of two points. For example, if the inclination of the projection axis 114 relative to a coordinate system in which the first incident pupil 133 is the origin is known, the intersection point between a circle 310 obtained from relative position information of two points and the projection axis 114 that passes through the position of the pattern 202 indicates the position of the exit pupil 113. Note that the method of obtaining the position of the exit pupil 113 and the projection axis 114 of the projection apparatus 110 using a geometric relationship as shown in FIG. 4 is not limited to the processing steps shown in the present embodiment. The method need only be a method of obtaining a relative position of a projection apparatus relative to at least one viewpoint using the pattern image positions on disparity images acquired by the image capturing system 120 and the positional relationship between viewpoints, as input information, and may also be a method in which intermediate data such as primary distance information is not used.

In the present embodiment, a method of obtaining the position and posture of the projection apparatus 110 has been described, in which a figure is drawn (construction) in a two-dimensional plane including a line segment connecting the first incident pupil 133 and the second incident pupil 143 of the image capturing system 120, using FIG. 4. If the position of the exit pupil 113 of the projection apparatus 110 is not present on this two-dimensional plane, the position and posture of the projection apparatus 110 is also obtained on a plane that includes the first incident pupil 133 of the first camera 130 and is orthogonal to the plane shown in FIG. 4, using the geometric relationship. Three-dimensional position and posture can be obtained by combining the positions and postures obtained on these planes. Note that it is preferable that the projection apparatus 110 is arranged at a position on an extended line of a straight line that connects the first incident pupil 133 and the second incident pupil 143 of the image capturing system 120. With this, the position and posture of the projection apparatus 110 need only be obtained on a two-dimensional plane, and the calculation amount can be reduced, and therefore high speed can be achieved and the power consumption can be suppressed.

According to the configuration described above, in the present embodiment, the positional relationship with a baseline length shorter than the baseline length needed for obtaining the desired measurement accuracy need only be kept, and therefore a high distance measurement accuracy can be stably obtained with a simpler configuration.

Also, the position and posture of the projection apparatus 110 can be obtained, when necessary, therefore the position and posture of the projection apparatus 110 can be changed, instead of being fixed to a predetermined state. Accordingly, the direction in which a pattern is projected and the position of the pattern can be determined such that a blockage due to the shape of a subject will not occur, and therefore the condition under which a subject can be measured can be largely extended. Note that the position and posture of the projection apparatus 110 need not be obtained every time measurement is performed. For example, the configuration may be such that the position and posture of the projection apparatus 110 is obtained when the position and posture of the projection apparatus 110 is actively changed or when the change in positional relationship due to the change in the environmental temperature or the disturbance such as vibration is concerned.

Note that the pattern to be projected is preferably a stripe pattern in which line segments that extend in a direction perpendicular to a straight line that connects the first incident pupil 133 and the second incident pupil 143 of the image capturing system 120 are substantially periodically arranged in the direction of the straight line (direction in which disparity occurs in a pair of disparity images). According to such a configuration, disparity images in which contrast is high in a disparity direction of the image capturing system 120 can be acquired, and the measurement accuracy of the primary distance information by the passive stereo method can be improved. Such a favorable pattern projection can also be realized with a mode in which, after performing test pattern projection, the pattern is dynamically configured based on a captured image capturing the test pattern, in the image capturing system 120.

Furthermore, it is desirable that at least one line segment (stripe) of the stripe pattern has a color or shape that is different from those of the other line segments. With this, error can be reduced when disparity images are compared, and the measurement error can be reduced. In particular, as a result of changing the color or shape of a pattern on the projection axis 114 from those of the other line segments, the calculation of the projection axis 114 can be facilitated. Also, it is preferable that the information regarding the pattern 200 (positional relationship between patterns) that is to be projected in order to measure the primary distance information is also stored on the image capturing system side in advance such that, when the image capturing system 120 recognizes the projected pattern images, the relative positional relationship between the patterns is understandable. With this, the image capturing system 120 easily estimates the positional relationship, in the pupil division direction, of subjects at positions at which the patterns are projected, from the positional relationship between the patterns (e.g., the positional relationship between stripes in a stripe pattern).

Also, a configuration may be adopted in which the pattern that is used when obtaining the relative position of the projection apparatus using the passive stereo method is different from the pattern that is used when acquiring the distance information with the pattern projection stereo method. Also, the measurement system 100 may perform measurement with the flow shown in FIG. 3B in addition to the processing shown in FIG. 2A. Note that each process in the flow in FIG. 3B is also executed by the control unit 151 of the measurement apparatus 150 or by the blocks operating in accordance with the control of the control unit 151. After step S1503, in step S1507, the projection apparatus 110 projects a pattern such as random dot or grade that is used in common in the pattern projection stereo, the subject on which the pattern is projected is captured by the image capturing system 120, and a pair of disparity images is acquired. According to such a configuration, a pattern suitable for each method can be used, and position calculation and distance measurement with higher accuracy can be performed. Also, as a result of changing the pattern to be used in the pattern projection stereo method to a pattern suitable for the shape of the subject using the primary distance information, such as changing the fineness of the pattern, and projecting the changed pattern, the distance information can be acquired with higher accuracy.

Second Embodiment

Figure 5A:
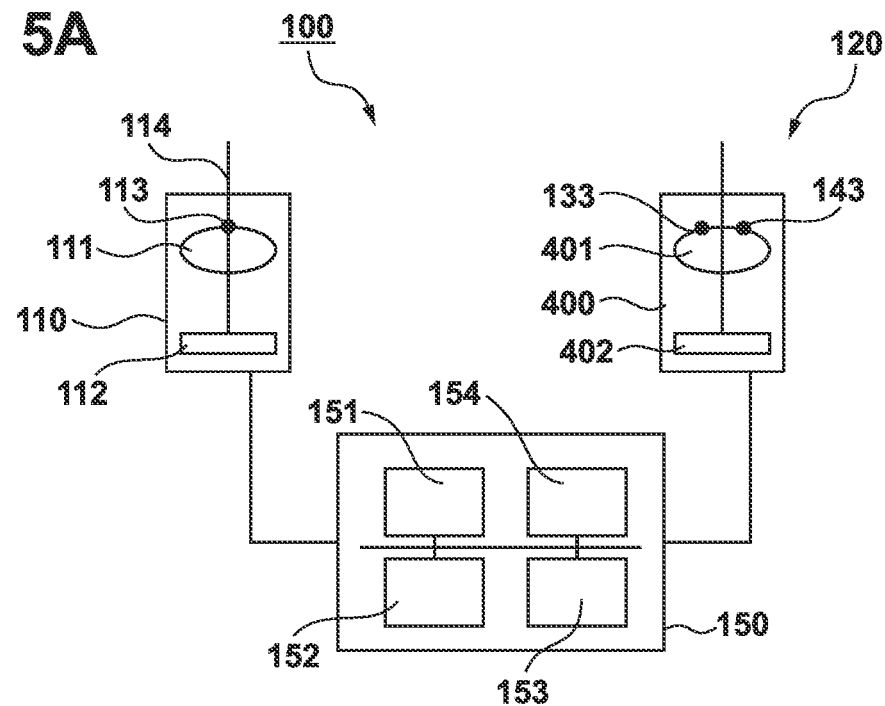
FIG. 5A is a block diagram illustrating a functional configuration of a measurement system according to a second embodiment.
Figure 5B:
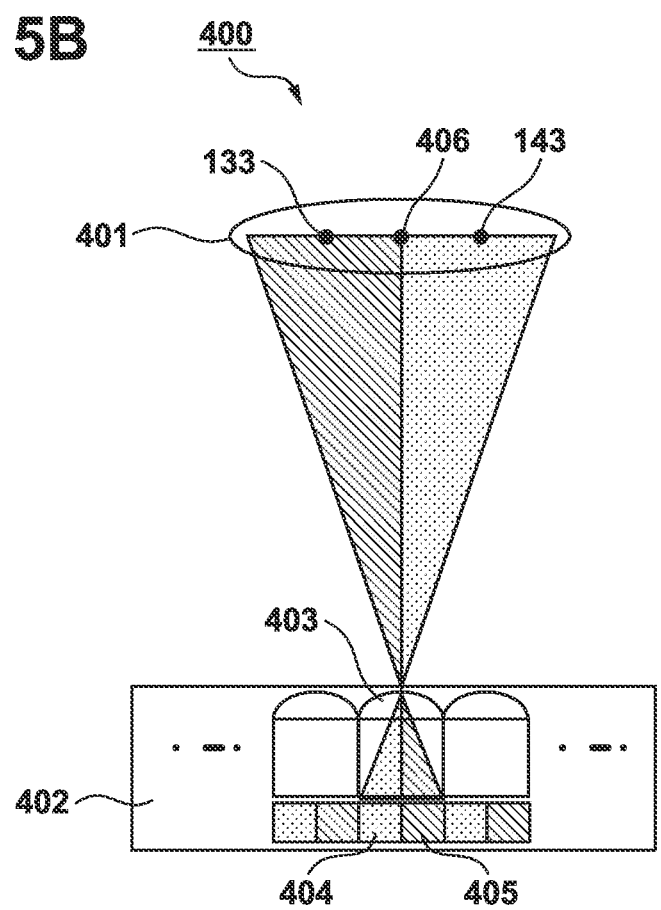
FIG. 5B is a diagram for describing a detailed configuration of an image capturing system 120 according to the second embodiment.

Next, a second embodiment will be described using FIGS. 5A and 5B. As shown in FIG. 5A, the second embodiment differs from the first embodiment in that an image capturing system 120 is constituted by a camera 400. The processing flow includes the example shown in FIG. 2A, and is the same as that of the first embodiment.

The camera 400 is constituted by an image capturing optical system 401 and an image sensor 402. In the image sensor 402, one pixel includes two photoelectric conversion units. As shown in FIG. 5B, each pixel of the image sensor 402 is constituted by a microlens 403, a first photoelectric conversion unit 404, and a second photoelectric conversion unit 405. The photoelectric conversion units and the pupil of the image capturing optical system 401 are in an optically conjugate relationship via the microlens 403, and disparity images from different viewpoints are acquired by dividing the pupil of the image capturing optical system. The image obtained using an image signal from the first photoelectric conversion unit 404 corresponds to an image in which the second incident pupil 143 in the first embodiment, which corresponds to one portion of the pupil region of the image capturing optical system 401, is the viewpoint. Also, the image obtained using an image signal from the second photoelectric conversion units 405 of the pixels is an image in which the first incident pupil 133 in the first embodiment, which corresponds to another portion of the pupil region of the image capturing optical system 401, is the viewpoint. Furthermore, the image obtained using a signal obtained by adding the image signal from the first photoelectric conversion unit 404 and the image signal from the second photoelectric conversion unit 405 of the pixels of the pixels is an image in which the incident pupil 406 is the viewpoint.

As described above, in the present embodiment, a pair of disparity images can be acquired with one image capturing optical system 401 and one image sensor 402, and therefore an image capturing system can be configured that is mechanically stable and in which the baseline length is short, which is different from the first embodiment in which a plurality of cameras are used, and stable and high distance measurement accuracy can be obtained with a simpler configuration.

Furthermore, as a result of also acquiring an usual image obtained by capturing without projecting a pattern, a measurement value with the same viewpoint as the usual image can be acquired, and the measurement value is added to an image as meta-information, or is used for recognition, and as a result, an image capturing apparatus with higher recognition accuracy is achieved.

Third Embodiment

Figure 6A:
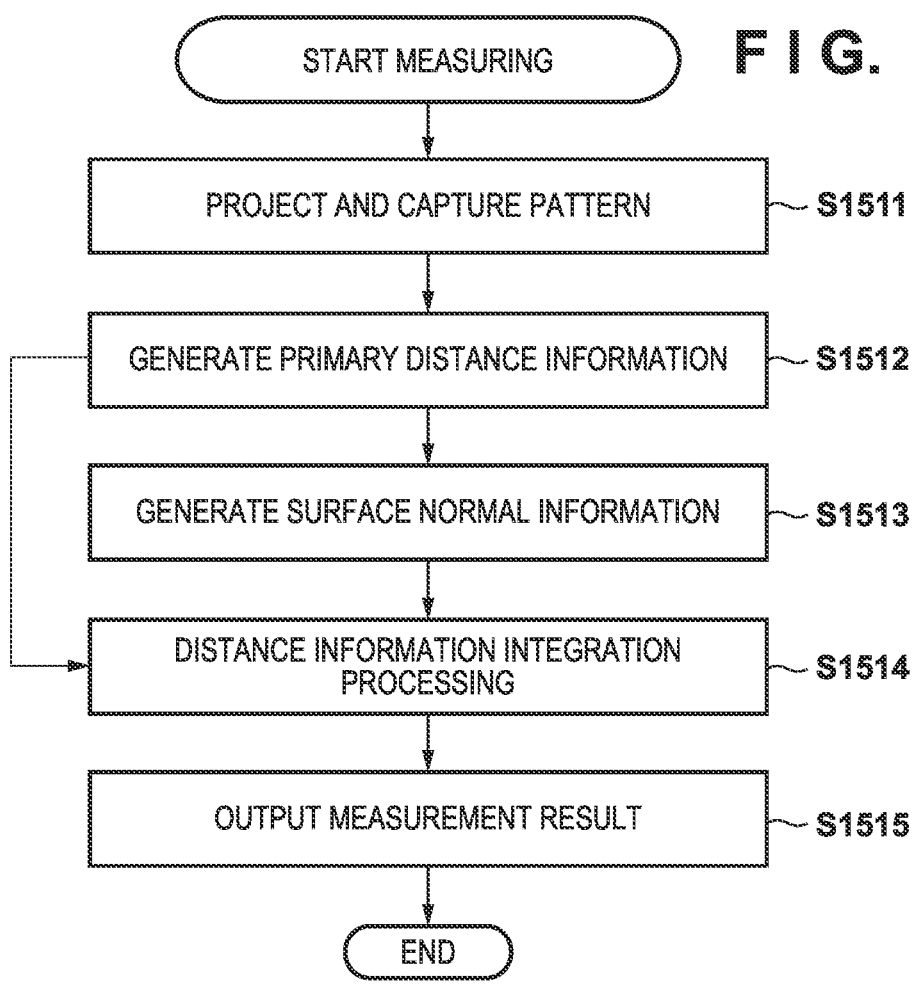
FIG. 6A is a flowchart illustrating distance measurement processing to be executed by a measurement apparatus 150 according to a third embodiment.
Figure 6B:
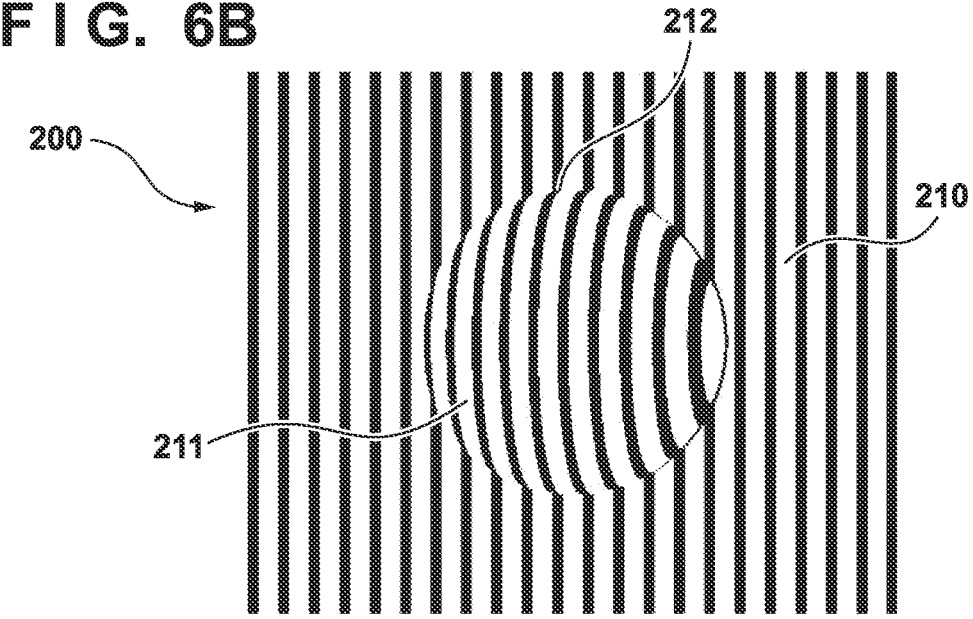
FIG. 6B is a diagram illustrating a captured image that can be obtained in a state in which pattern projection according to the third embodiment is performed.

Next, a third embodiment will be described using FIGS. 6A and 6B. Note that each process in the flow in FIG. 6A is also executed by a control unit 151 of a measurement apparatus 150 or by the blocks operating in accordance with the control of the control unit 151. FIG. 6A shows a processing flow, and in step S1511, a pattern is projected and captured. FIG. 6B shows an example of an image, with a viewpoint being the first incident pupil 133, that is obtained by, using the measurement system 100 shown in FIG. 5A, the projection apparatus 110 projecting a pattern, and the image capturing system 120 performing capturing. The pattern to be projected is a stripe pattern in which line segments that extend in a direction perpendicular to a straight line connecting the first incident pupil 133 and the second incident pupil 143 of the image capturing system 120 are substantially periodically arranged in the direction of the straight line. The subject is a planar surface and a hemisphere object placed on the planar surface.

In step S1512, a distance/shape calculation unit 153 calculates primary distance information of the subject from the captured disparity images using the passive stereo method.

Next, in step S1513, the distance/shape calculation unit 153 generates surface normal information from the stripe interval of a stripe pattern image in one disparity image. The stripe interval of a stripe pattern image indicates an inclination of the surface in a stripe periodic direction, and when the surface directly faces in the observation direction, the stripe interval is the same as the stripe interval of the projection pattern, and when the surface normal inclines, the stripe interval decreases. As shown in FIG. 6B, the stripes in a region 210, which is a planar surface, are straight lines and are at equal intervals, for example. On the other hand, the stripes in a region 211, which is a curved surface, are curve lines, and the stripe interval changes according to the position.

In step S1513, the distance/shape calculation unit 153 obtains a local stripe interval at a position on the image, and with this, can acquire the surface normal information at a local position of the subject. Furthermore, in step S1514, the distance/shape calculation unit 153 generates highly accurate distance and shape information by integrating the primary distance information with the surface normal information.

Then, in step S1515, the control unit 151 stores the calculated highly accurate distance and shape information in a storage unit, which is not shown, or outputs it to an external apparatus via a recording unit, a communication unit, or the like.

The primary distance information obtained using the passive stereo method and the surface normal information obtained using the stripe interval are in a relationship between differential and integration. That is, the integration of the surface normal is normally the same as the distance information, or the surface normal is normally the same as the differential of the distance information. Therefore, the distance/shape calculation unit 153 compares these, and can reduce the variation by removing an obvious error value and averaging. Alternatively, information obtained by integrating the surface normal is used with respect to a planar surface portion, and the distance information is used for obtaining the level difference amount at a level difference portion, and with this, the variation can be suppressed. In this way, as a result of integrating the primary distance information and the surface normal information, highly accurate distance and shape information can be acquired relative to the distance and shape information obtained using a single measurement method. Note that the order of step S1512 and step S1513 may be exchanged.

Also, here, the configuration may also be such that, as shown in FIG. 7A, the pattern used when obtaining the primary distance information using the passive stereo method is changed from the pattern used when acquiring the surface normal information from the stripe interval, by additionally performing the processing in step S1516. Note that each process in the flow in FIG. 7A is also executed by the control unit 151 of the measurement apparatus 150 or by the blocks operating in accordance with the control of the control unit 151. In step S1516, the control unit 151 instructs the projection apparatus 110 to project a pattern via a communication unit, and also instructs the image capturing system 120 to capture an image in a state in which the pattern is projected, via the communication unit, and newly acquires a pair of disparity images obtained by capturing from the image capturing system 120. Here, it is desirable that the stripe interval of the pattern used when acquiring the surface normal information in step S1516 is smaller than that of the pattern used when obtaining the primary distance information in step S1511. With this, the surface normal information that is spatially dense can be acquired. When obtaining the surface normal information, orthogonal stripe patterns may be switched and projected, or a double cross pattern obtained by combining orthogonal stripe patterns or a dotted line pattern may be projected. According to such a configuration, normal lines in axis directions that are orthogonal to each other can be obtained, and therefore the surface normal information regarding a subject can be obtained with higher accuracy.

Also, the pattern at the time of acquiring the surface normal information may be selected based on the primary distance information. For example, as the distance from the projection apparatus increases, the projection pattern image becomes coarse, and as the distance decreases, the projection pattern image becomes fine, and therefore the pattern is controlled such that the stripe interval needed to acquire the surface normal information is achieved according to the distance. Also, the surface inclination direction can be roughly grasped from the primary distance information, therefore as a result of selecting and projecting a stripe pattern in which stripes extend in a direction orthogonal to the inclination direction, or projecting a fine pattern, the surface inclination amount (inclination amount of the surface normal) can be acquired with high accuracy.

Also, the pattern to be used in the passive stereo method may also be selected based on the surface normal information. When the surface normal inclines, the stripe pattern image becomes too coarse, the disparity images cannot be compared with each other, and the distance measurement accuracy decreases, and therefore the fineness of the projection pattern is increased with respect to an inclined surface. With this, highly accurate distance information can be acquired. Accordingly, a pattern suitable for the shape of a subject can be projected, and therefore the distance information can be acquired with higher accuracy.

Also, it is desirable that the pattern at the time of acquiring the surface normal information is a stripe pattern in which line segments that extend in a direction perpendicular to a straight line connecting the projection apparatus 110 and the viewpoint of the image capturing system 120 are substantially periodically arranged in the direction of the straight line. According to such a configuration, the change in the stripe interval relative to the surface normal increases, and therefore the surface normal can be detected with high accuracy.

Figure 7B:
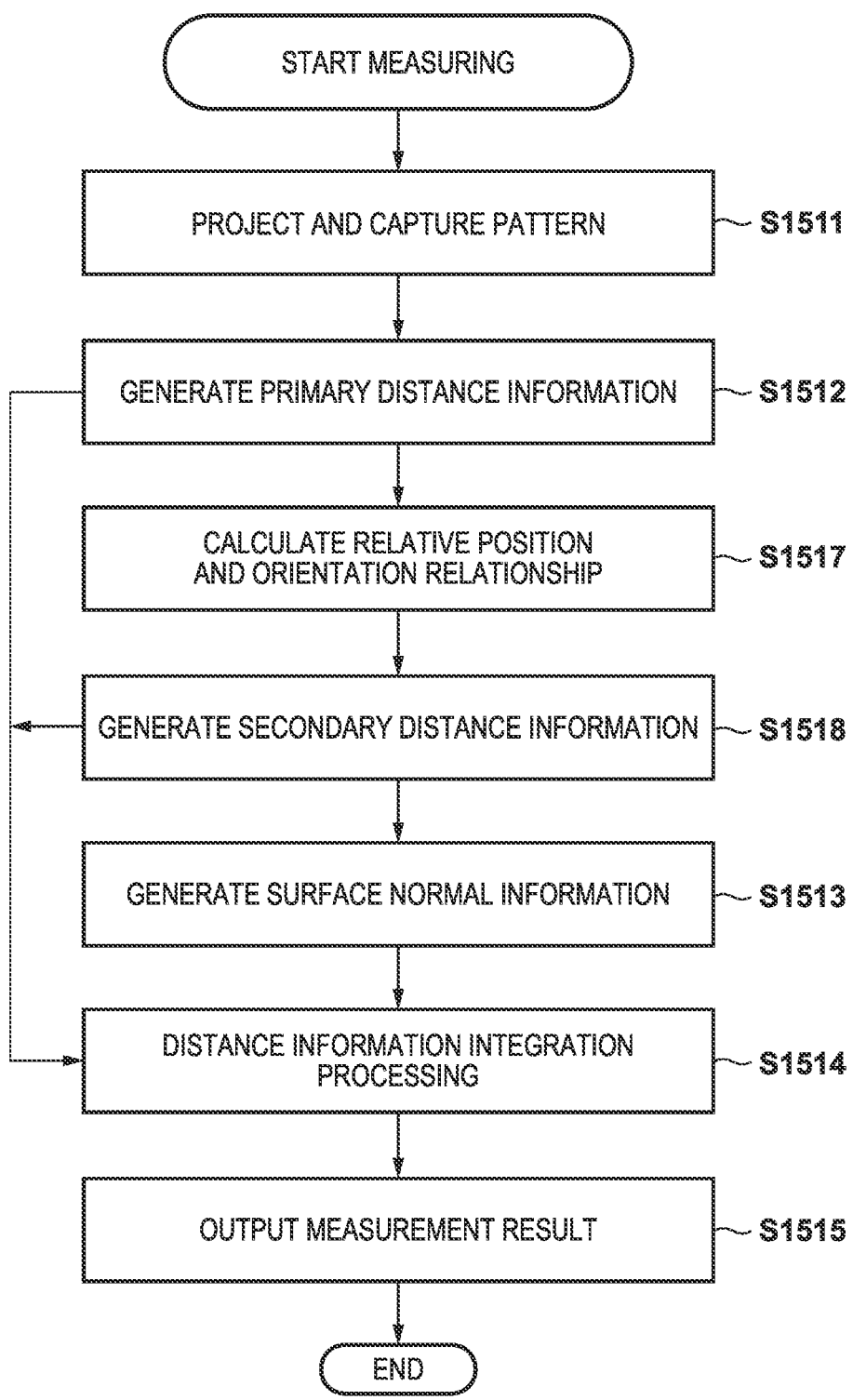
FIG. 7B is a flowchart illustrating another modification of distance measurement processing to be executed by the measurement apparatus 150 according to the third embodiment.

Furthermore, as illustrated in FIG. 7B, the distance information acquired using the pattern projection stereo method may also be used. Note that each process in the flow in FIG. 7B is also executed by the control unit 151 of the measurement apparatus 150 or by the blocks operating in accordance with the control of the control unit 151.

In step S1517, a relative position calculation unit 154 calculates the position and posture of the projection apparatus 110 relative to the position of the image capturing system 120 from the primary distance information regarding a subject and the positions of the pattern images on disparity images.

Next, in step S1518, the distance/shape calculation unit 153 calculates the secondary distance information regarding the subject using the pattern projection stereo method from the calculated position and posture of the projection apparatus 110, the position and posture of the image capturing system 120, and the positions of the pattern image on the disparity images.

In step S1514, the distance/shape calculation unit 153 compares between the primary distance information, secondary distance information, surface normal information, and performs removal of an error value and averaging, and as a result, can acquire more stable and highly accurate distance and shape information. As described above, in the present embodiment, as a result of calculating one distance and shape information by integrating the primary distance information obtained using the passive stereo method and the surface normal information obtained by using a stripe interval, more highly accurate distance and shape information can be generated.

Fourth Embodiment

Figure 8A:
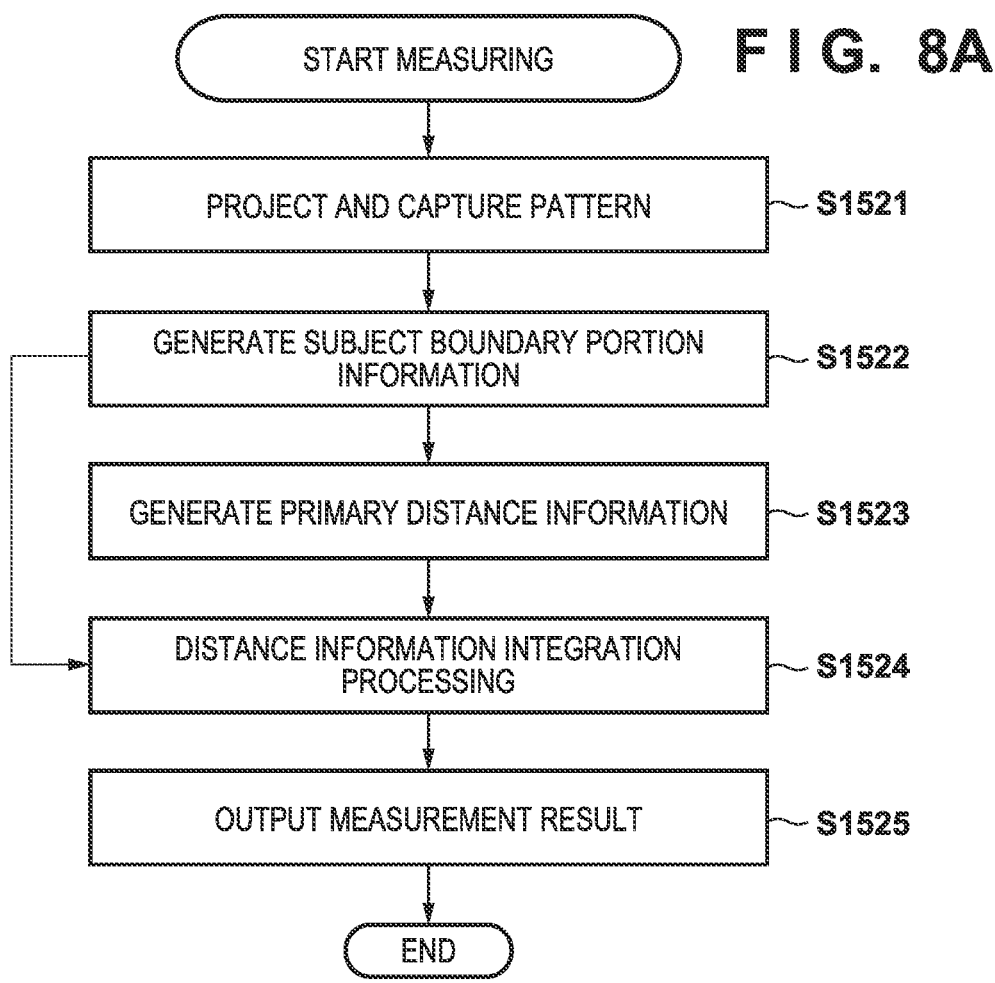
FIG. 8A is a flowchart illustrating distance measurement processing to be executed by a measurement apparatus 150 according to a fourth embodiment.

In the present embodiment, a boundary region of a subject is extracted by analyzing the continuity of stripes in images based on a stripe pattern projected by a projection apparatus 110, and the distance and shape information is acquired with high accuracy using this information. The processing flow according to the present embodiment will be described using FIG. 8A. Note that each process in the flow in FIG. 8A is also executed by a control unit 151 of a measurement apparatus 150 or by the blocks operating in accordance with the control of the control unit 151.

In step S1521, the control unit 151 instructs the projection apparatus 110 to project a stripe pattern via a communication unit, instructs an image capturing system 120 to capture an image in a state in which the stripe pattern is projected, via the communication unit, and acquires a pair of disparity images obtained by capturing from the image capturing system 120.

Figure 8B:
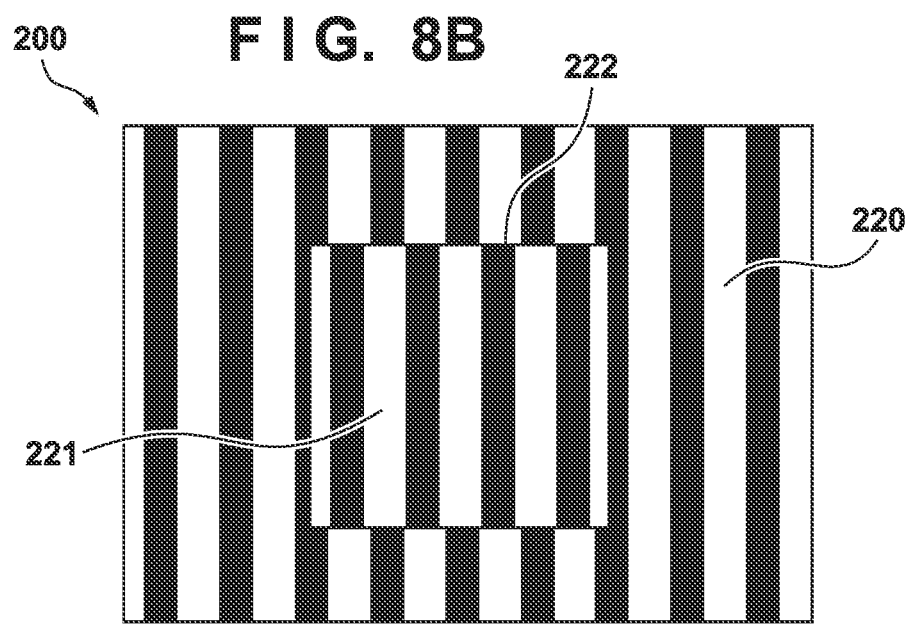
FIG. 8B is a diagram illustrating a captured image that can be obtained in a state in which pattern projection according to the fourth embodiment is performed.

Next, in step S1522, a distance/shape calculation unit 153 generates boundary portion information of the subject. In FIG. 6B, the stripes in the region 210, which is a planar surface, are lines in the same direction, and in the stripes in the region 211, which is a curved surface, the line direction changes but the change is small. On the other hand, in a region (boundary portion) 212 in which the change in distance is larger, the line direction drastically changes. FIG. 8B shows an example of an image of a subject constituted by a planar surface and a planar surface object that is placed on the near side and is separated from the planar surface in the depth direction, and in a boundary portion 222 of the subject including a level difference in the depth direction, the stripe lines are broken and are discontinuous. In this way, as a result of analyzing the stripe continuity, the region in which the change in distance is large, that is, the boundary portion of the subject, can be extracted.

In step S1523, the distance/shape calculation unit 153 calculate the primary distance information of the subject from the captured disparity images using the passive stereo method.

Next, in step S1524, the distance/shape calculation unit 153 generates highly accurate distance and shape information from the primary distance information using the boundary portion information of the subject. In the boundary region in which the change in distance is large, the accuracy of the stereo method decreases in principle. Therefore, with respect to the extracted boundary region, the distance and shape information is generated by extending the primary distance information of each of the regions that sandwich the boundary region to the boundary portion, without using the primary distance information obtained using the stereo method. For example, in the example shown in FIG. 8B, the primary distance information regarding the region 221 is used on the region 221 side from the boundary portion 222, and the primary distance information regarding the region 220 is used on the region 220 side. In the example shown in FIG. 6B, the primary distance information regarding the region 210 is used on the region 210 side from the boundary portion 212, and the primary distance information is generated, on the region 211 side, such that the surface normal continuously changes in the region 211. In this way, as a result of extracting a boundary region of a subject based on the stripe shape, and obtaining the distance information based on this result, the distance and shape information can be obtained with high accuracy even regarding a boundary portion in which the change in distance is large. Here, as a result of using the secondary distance information obtained using the pattern projection stereo method and the surface normal information obtained from the stripe interval, the distance and shape information regarding the subject can be obtained with higher accuracy.

Then, in step S1525, the control unit 151 stores the calculated highly accurate distance and shape information in a storage unit, which is not shown, or outputs it to an external apparatus via a recording unit, a communication unit, or the like.

As described above, according to the present embodiment, stripe pattern light is projected by the projection apparatus 110, a boundary region of a subject is extracted by analyzing the stripe continuity in an image that includes the subject and pattern light, and the distance and shape information can be acquired with higher accuracy by using the information regarding the boundary region.

According to the present invention, favorable measurement accuracy can be realized while suppressing the increase in apparatus scale and the reduction in usability.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A measurement apparatus comprising:
   a projection apparatus configured to project a predetermined pattern on a subject; and
   an image capturing system configured to capture a group of images at two viewpoints arranged in different locations,
   wherein each of the two viewpoints is arranged in a position where a distance from one viewpoint between the two viewpoints to another viewpoint between the two viewpoints is shorter than a distance from each of the two viewpoints to the projection apparatus,
   the measurement apparatus further comprising:
   at least one processor; and
   a memory storing a program that, when executed by the at least one processor, causes the at least one processor to function as:
   a relative position calculation unit configured to obtain a relative position of the projection apparatus relative to at least one of the two viewpoints based on pattern image positions on the group of images and a positional relationship between the two viewpoints; and
   a distance obtaining unit configured to obtain distance information of the subject based on the relative position and a pattern image position on an image at a viewpoint whose the relative position was obtained.

2. The measurement apparatus according to claim 1, wherein a position and a posture of the projection apparatus is changeable.

3. The measurement apparatus according to claim 1, wherein the projection apparatus is arranged at a position on an extended line of a straight line connecting the two viewpoints.

4. The measurement apparatus according to claim 1, wherein the program further causes the at least one processor to function as:
   a control unit configured to control operations of the projection apparatus, wherein the control unit differentiates the predetermined pattern to be projected by the projection apparatus between when the relative position is obtained and when the distance information is obtained.

5. The measurement apparatus according to claim 4, wherein
the control unit causes the projection apparatus to project, as the predetermined pattern, a stripe pattern in which line segments that extend in a direction perpendicular to a straight line connecting the two viewpoints are substantially periodically arranged in a direction of the straight line,
the distance obtaining unit includes obtaining surface normal information of the subject based on a stripe interval of a pattern image of the stripe pattern on the image at at least one of the two viewpoints.

6. The measurement apparatus according to claim 5, wherein a color and/or a shape of at least one line segment, of the stripe pattern, differs from those of the other line segments.

7. The measurement apparatus according to claim 5, wherein
the distance obtaining unit obtains the distance information of the subject based on the surface normal information, the relative position, and the pattern image position on the image at the viewpoint whose the relative position was obtained.

8. The measurement apparatus according to claim 5, wherein
the distance obtaining unit obtains the distance information of the subject based on the surface normal information, the relative position, the pattern image position on the image at the viewpoint whose the relative position was obtained, and a distance between the two viewpoints.

9. The measurement apparatus according to claim 5, wherein
when the surface normal information is obtained, the control unit causes the projection apparatus to project the stripe pattern with a smaller stripe interval than when the relative position is obtained.

10. The measurement apparatus according to claim 1, wherein
the predetermined pattern is a pattern including a line segment, and
the distance obtaining unit extracts a boundary region of the subject based on a shape of a pattern image of the line segment on the image at the viewpoint whose the relative position was obtained, and obtains the distance information of the subject based on information regarding the boundary region.

11. The measurement apparatus according to claim 1, wherein the image capturing system divides light incident through a single optical system to capture the group of images at the two viewpoints.

12. An image capturing apparatus, comprising:
the measurement apparatus according to claim 1,
wherein the image capturing system also acquires an image that is captured without projecting the predetermined pattern.

13. A measurement apparatus, comprising:
a projection apparatus configured to project a predetermined pattern on a subject; and
an image capturing system configured to capture a group of images at two viewpoints arranged in different locations,
wherein the measurement apparatus further comprises:
at least one processor; and
a memory storing a program that, when executed by the at least one processor, causes the at least one processor to function as:
a control unit configured to cause the projection apparatus to project, as
the predetermined pattern, a stripe pattern in which line segments that extend in a direction perpendicular to a straight line connecting the two viewpoints are substantially periodically arranged in a direction of the straight line;
a first obtaining unit configured to obtain surface normal information of the subject based on a stripe interval of a pattern image of the stripe pattern on an image at at least one of the two viewpoints, and
a second obtaining unit configured to obtain distance information of the subject based on the surface normal information, a distance between the two viewpoints, and pattern image positions on the group of images.

14. The measurement apparatus according to claim 13, wherein the control unit differentiates the predetermined pattern to be projected on the projection apparatus between when the surface normal information is obtained and when the pattern image positions are obtained, and causes, when the surface normal information is obtained, the projection apparatus to project the predetermined pattern with a smaller stripe interval than when the pattern image positions are obtained.

15. The measurement apparatus according to claim 13, wherein when the surface normal information is obtained, the control unit causes the projection apparatus to project, as the predetermined pattern, a stripe pattern in which line segments that extend in a direction perpendicular to a straight line connecting the projection apparatus and each viewpoint of the image capturing system are substantially periodically arranged in a direction of the straight line.

16. A measurement system, comprising:
a projection apparatus configured to project a predetermined pattern on a subject;
an image capturing system configured to capture a group of images at two viewpoints arranged in different locations; and
a measurement apparatus that is connected to the projection apparatus and the image capturing system,
wherein each of the two viewpoints is arranged in a position where a distance from one viewpoint between the two viewpoints to another viewpoint between the two viewpoints is shorter than a distance from each of the two viewpoints to the projection apparatus,
the measurement apparatus further comprising:
at least one processor; and
a memory storing a program that, when executed by the at least one processor, causes the at least one processor to function as:
a relative position calculation unit configured to obtain a relative position of the projection apparatus relative to at least one of the two viewpoints based on pattern image positions on the group of images and a positional relationship between the two viewpoints; and
a distance obtaining unit configured to obtain distance information regarding of the subject based on the relative position and a pattern image position on an image at a viewpoint whose the relative position was obtained.

17. A measurement system, comprising:
a projection apparatus configured to project a predetermined pattern on a subject;

an image capturing system configured to capture a group of images at two viewpoints arranged in different locations; and a measurement apparatus that is connected to the projection apparatus and the image capturing system, wherein the measurement apparatus further comprising:

at least one processor; and a memory storing a program that, when executed by the at least one processor, causes the at least one processor to function as:

a control unit configured to cause the projection apparatus to project, as the predetermined pattern, a stripe pattern in which line segments that extend in a direction perpendicular to a straight line connecting the two viewpoints are substantially periodically arranged in a direction of the straight line;

a first obtaining unit configured to obtain surface normal information of the subject based on a stripe interval of a pattern image of the stripe pattern on an image at at least one of the two viewpoints; and a second obtaining unit configured to obtain distance information of the subject based on the surface normal information, a distance between the two viewpoints, and pattern image positions on the group of images.

18. A control method of a measurement apparatus including a projection apparatus configured to project a predetermined pattern on a subject; and an image capturing system configured to capture a group of images at two viewpoints arranged in different locations, each of the two viewpoints is arranged in a position where a distance from one viewpoint between the two viewpoints to another viewpoint between the two viewpoints being shorter than a distance from each of the two viewpoints to the projection apparatus, the control method comprises:

obtaining a relative position of the projection apparatus relative to at least one of the two viewpoints based on pattern image positions on the group of images and a positional relationship between the two viewpoints; and obtaining distance information of the subject based on the relative position and a pattern image position on an image at a viewpoint whose the relative position was obtained.

19. A non-transitory computer-readable storage medium storing a program for causing a computer to perform the control method according to claim 18.

20. A control method of a measurement apparatus including a projection apparatus configured to project a predetermined pattern on a subject; and an image capturing system configured to capture a group of images at two viewpoints arranged in different locations, the control method comprises:

causing the projection apparatus to project, as the predetermined pattern, a stripe pattern in which line segments that extend in a direction perpendicular to a straight line connecting the two viewpoints are substantially periodically arranged in a direction of the straight line;

obtaining surface normal information of the subject based on a stripe interval of a pattern image of the stripe pattern on an image at at least one of the two viewpoints, and obtaining distance information of the subject based on the surface normal information, a distance between the two viewpoints, and pattern image positions on the group of images.

* * * * *